United States Patent
Duvdevany

(10) Patent No.: US 10,324,283 B2
(45) Date of Patent: *Jun. 18, 2019

(54) OPENING ANGLE MEASUREMENT OF AN OSCILLATING MEMS MIRROR

(71) Applicant: STMicroelectronics Ltd, Netanya (IL)

(72) Inventor: Offir Duvdevany, Tel Aviv (IL)

(73) Assignee: STMicroelectronics Ltd, Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,529

(22) Filed: Oct. 3, 2017

(65) Prior Publication Data

US 2018/0024351 A1    Jan. 25, 2018

Related U.S. Application Data

(63) Continuation of application No. 15/192,718, filed on Jun. 24, 2016, now Pat. No. 9,810,902.

(51) Int. Cl.
*G02B 26/08* (2006.01)
*G02B 26/10* (2006.01)
*G01D 5/24* (2006.01)
*G01D 5/243* (2006.01)

(52) U.S. Cl.
CPC .......... *G02B 26/0833* (2013.01); *G01D 5/24* (2013.01); *G01D 5/243* (2013.01); *G02B 26/105* (2013.01)

(58) Field of Classification Search
CPC .............. G02B 26/0833; G02B 26/105; G02B 26/0841; G02B 26/002; G02B 26/08; G01D 5/24; G01D 5/2417; G01J 3/4532; G01J 3/4535; G01J 2003/2879
USPC ...................................................... 359/199.4
See application file for complete search history.

(56) References Cited

U.S. PATENT DOCUMENTS

| | | | |
|---|---|---|---|
| 8,553,308 B2 | 10/2013 | Goren et al. | |
| 8,817,359 B2 | 8/2014 | Chau | |
| 9,810,902 B1 * | 11/2017 | Duvdevany | G02B 26/0833 |

* cited by examiner

*Primary Examiner* — Euncha P Cherry
(74) *Attorney, Agent, or Firm* — Crowe & Dunlevy

(57) ABSTRACT

A device disclosed herein includes a feedback measuring circuit to measure a signal flowing through a movable MEMS mirror. Processing circuitry determines a time at which the signal indicates that a capacitance of the movable MEMS mirror is substantially at a maximum capacitance. The processing circuitry also determines, over a window of time extending from the time at which the signal indicates that the capacitance of the movable MEMS mirror is substantially at the maximum to a given time, a total change in capacitance of the movable MEMS mirror compared to the maximum capacitance. The processor further determines the capacitance at the given time as a function of the total change in capacitance, and determines an opening angle of the movable MEMS mirror as a function of the capacitance at the given time.

15 Claims, 5 Drawing Sheets

OPENING ANGLE MEASUREMENT OF AN OSCILLATING MEMS MIRROR

PRIORITY CLAIM

This application is a continuation of U.S. patent application Ser. No. 15/192,718 filed Jun. 24, 2016, the disclosure of which is hereby incorporated by reference in its entirety to the maximum extent allowable by law.

TECHNICAL FIELD

This disclosure relates to optical systems for scanning or deflecting light beams, and, in particular, to determining and controlling the opening angles of an oscillating mirror in a MEMS device.

BACKGROUND

Certain devices such as wafer defect scanners, laser printers, document scanners, projectors and the like often employ a collimated laser beam that scans across a flat surface in a straight line path. These devices employ tilting mirrors to deflect the beam to perform the scanning. These tilting mirrors may be, or may include, Micro Electro Mechanical Systems ("MEMS") devices.

Common mirrors used in MEMS devices include a stator and a rotor, with the rotor or structures carried by the rotor being reflective. The stator and/or rotor are driven with a drive signal which results in the rotor rotating with respect to the stator, thereby changing the angle of reflectance of an incident light beam on the rotor. By oscillating the rotor between two orientations, an opening angle of the mirror is defined, and scanning of the light beam across the flat surface is accomplished.

It is desirable to be able to precisely control movement of the rotor. To enable that precise control, collection of accurate data about the current position of the mirror is important. The collection of such accurate data, and consequently the precise control of the mirror, has proven troublesome due to changes in temperature, changes to the light beam itself, and other factors. This can result in commercially undesirable performance of the device. Thus, there is a commercial desire for the development of accurate ways to measure data about the position of the mirror, and precise ways to control the position of the mirror, are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A device disclosed herein includes a feedback measuring circuit to measure a signal flowing through a movable MEMS mirror. Processing circuitry determines a time at which the signal indicates that a capacitance of the movable MEMS mirror is substantially at a maximum capacitance. The processing circuitry also determines, over a window of time extending from the time at which the signal indicates that the capacitance of the movable MEMS mirror is substantially at the maximum to a given time, a total change in capacitance of the movable MEMS mirror compared to the maximum capacitance. The processor further determines the capacitance at the given time as a function of the total change in capacitance, and determines an opening angle of the movable MEMS mirror as a function of the capacitance at the given time.

A method aspect disclosed herein is a method of controlling an opening angle of a movable MEMS mirror. The method includes driving the movable MEMS mirror with a periodic signal such that the MEMS mirror oscillates, measuring a signal flowing through the movable MEMS mirror as it oscillates, and determining a time at which the signal indicates that a capacitance of the movable MEMS mirror is substantially at a maximum capacitance. The method also includes determining, over a window of time extending from the time at which the signal indicates that the capacitance of the movable MEMS mirror is substantially at the maximum to a given time, a total change in capacitance of the movable MEMS mirror compared to the maximum capacitance. The capacitance at the given time is determined as a function of the total change in capacitance. An opening angle of the movable MEMS mirror is determined as a function of the capacitance at the given time. The opening angle of the movable MEMS mirror is determined based upon the opening angle not being equal to a desired opening angle.

Another method disclosed herein includes measuring a signal flowing through a movable MEMS mirror as it oscillates, and determining a time at which the signal indicates that a capacitance of the movable MEMS mirror is substantially at a maximum capacitance. This method also includes determining, over a window of time extending from the time at which the signal indicates that the capacitance of the movable MEMS mirror is substantially at the maximum to a given time, a total change in capacitance of the movable MEMS mirror compared to the maximum capacitance, and determining the capacitance at the given time as a function of the total change in capacitance.

In an embodiment, a method is provided for determining an opening angle of a movable MEMS mirror. The method comprises: determining a total change in capacitance of the movable MEMS mirror from a time at which the capacitance of the movable MEMS mirror is at a maximum to a given time at which knowledge of the opening angle of the movable MEMS mirror is desired; and calculating the opening angle of the movable MEMS mirror at the given time based upon the total change in capacitance.

In an embodiment, a picoprojector comprises: a housing; a laser generator carried within the housing; a movable MEMS mirror carried within the housing and upon which a laser generated by the laser generator impinges; mirror drive circuitry configured to generate a drive signal for the movable MEMS mirror; a feedback circuit configured to measure a mirror sense signal flowing through the movable MEMS mirror; and processing circuitry. The processing circuit is configured to, based upon the mirror sense signal: determine an opening angle of the movable MEMS mirror at a given time, as a function of a total change in capacitance of the movable MEMS mirror from a time at which the capacitance of the movable MEMS mirror is at a maximum to the given time, and as a function of the capacitance at the given time; and generate a control signal to cause the mirror drive circuitry to adjust the drive signal, as a function of the determined opening angle of the movable MEMS mirror.

In an embodiment, a picoprojector comprises: a housing; a laser generator carried within the housing; a movable MEMS mirror carried within the housing and upon which a laser generated by the laser generator impinges; mirror drive circuitry for the movable MEMS mirror; an amplifier configured to amplify a mirror sense signal flowing through the movable MEMS mirror; an analog to digital converter configured to receive the amplified version of the mirror sense signal and to generate a digitized version of the mirror sense signal; and a microprocessor configured to: determine an opening angle of the movable MEMS mirror as a function of the digitized mirror sense signal at a given time at which knowledge of the opening angle of the movable MEMS mirror is desired, the digitized mirror sense signal at a time at which capacitance of the movable MEMS mirror is at the maximum capacitance, the given time, and the time at which the capacitance of the movable MEMS mirror is at the maximum capacitance; and generate a control signal for the mirror drive circuitry as a function of the opening angle of the movable MEMS mirror.

DETAILED DESCRIPTION

Figure 1:
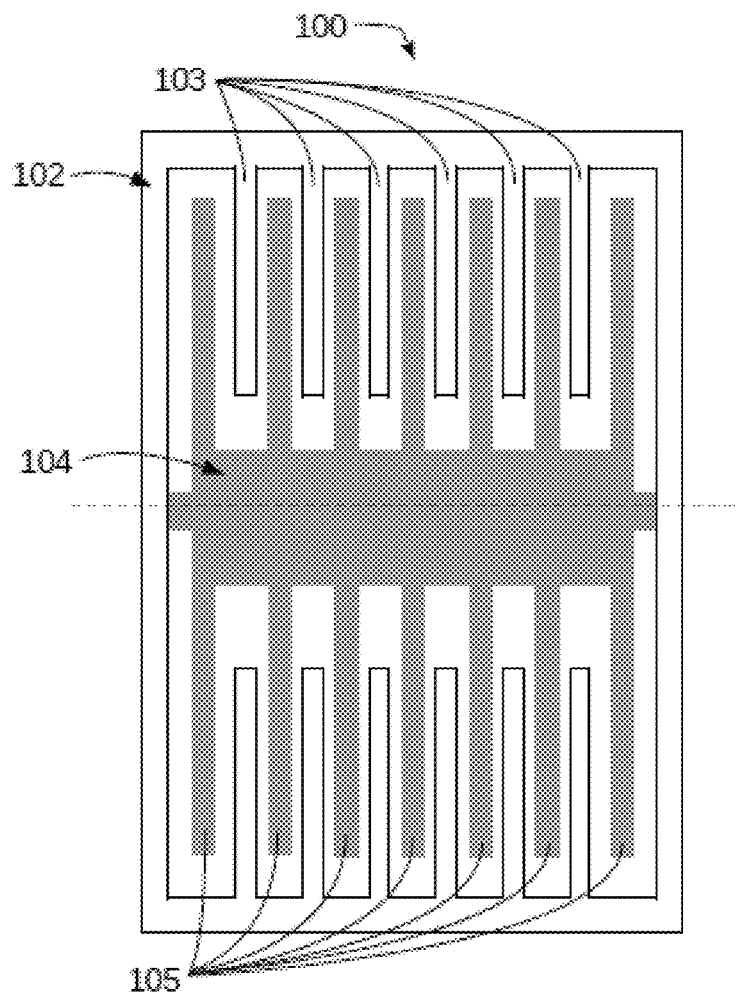
FIG. 1 is a top plan view of a movable MEMS mirror as may be used with the techniques described in this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and reference numbers separated by century, as well as reference numbers with prime notation, indicate similar elements in other applications or embodiments.

First, a movable MEMS mirror 100, such as may be used in devices such as wafer defect scanners, laser printers, document scanners, projectors, and pico-projectors, will now be described with reference to FIG. 1. The movable MEMS mirror 100 includes a stator 102 having inwardly projecting fingers 103. A rotor 104 is positioned within the stator 102 and has outwardly projecting fingers 105 that interleave with the inwardly projecting fingers 103 of the stator 102. The rotor 104 spins about its axis, rotating its mirror surface with respect to the stator 102.

Either the stator 102 or the rotor 104 is supplied with a periodic signal, such as a square wave, while the other is supplied with a reference voltage. In the case where the periodic signal has an oscillating square voltage, for example, electrostatic forces cause the rotor 104 to rotate about its axis relative to the stator 102. In the case where the periodic signal has an oscillating square current, for example, magnetic forces cause the rotor 104 to rotate about its axis relative to the stator 102. Indeed, the movable MEMS mirror 100 may be driven according to any suitable way known to those of skill in the art.

Figure 2:
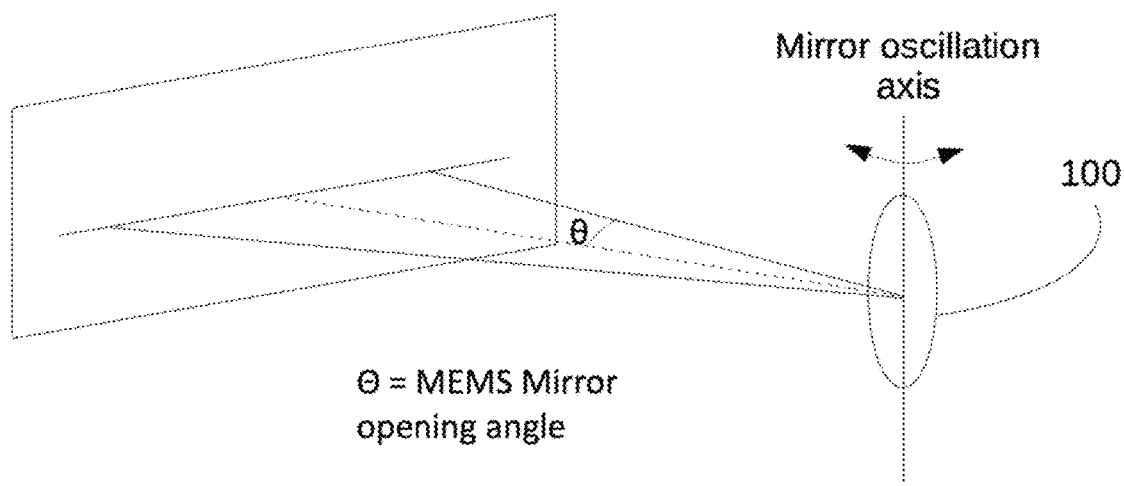
FIG. 2 is a perspective view showing operation of a movable MEMS mirror scanning in accordance with the techniques described in this disclosure.

For use in scanning a light beam across a surface, the movable MEMS mirror 100 is driven so that it oscillates at its resonant frequency between two set or controllable rotation limits. Shown in FIG. 2 is the movable MEMS mirror 100 scanning a light beam across a projection screen between two set rotation limits that define an "opening angle" θ of the movable MEMS mirror 100.

A system 200 for measuring and controlling the opening angle of the movable MEMS mirror 100 is now described with reference to FIG. 3A. The system 200 includes a current sensing operational amplifier 202 having an inverting input coupled to the rotor of the movable MEMS mirror 100, and a non-inverting input coupled to ground. A microcontroller 204 has an input coupled to receive the output of the operational amplifier 202. It should be appreciated that although a microcontroller 204 is shown, any suitable circuitry, such as a programmable logic device or programmable logic controller, may be used instead.

The microcontroller 204 includes a hardware integrator 212 that integrates the amplified signal received from the amplifier 202. An analog to digital converter (ADC) 214 samples and digitizes the output of the integrator 212, and delivers its output to a microprocessor 216. It should be understood that in the case where a programmable logic device or programmable logic controller is used, the microprocessor 216 may represent electrical circuits such as logic gates, amplifiers, and various arrangements of transistors. The output of the microprocessor 216 is coupled to a driver 99, which in turn is coupled to the movable MEMS mirror 100.

The operation of the system 200 will be described below, but first the relationship between a capacitance between the stator 102 and rotor 104 and the opening angle of the movable MEMS mirror 100 will be described.

Figure 4:
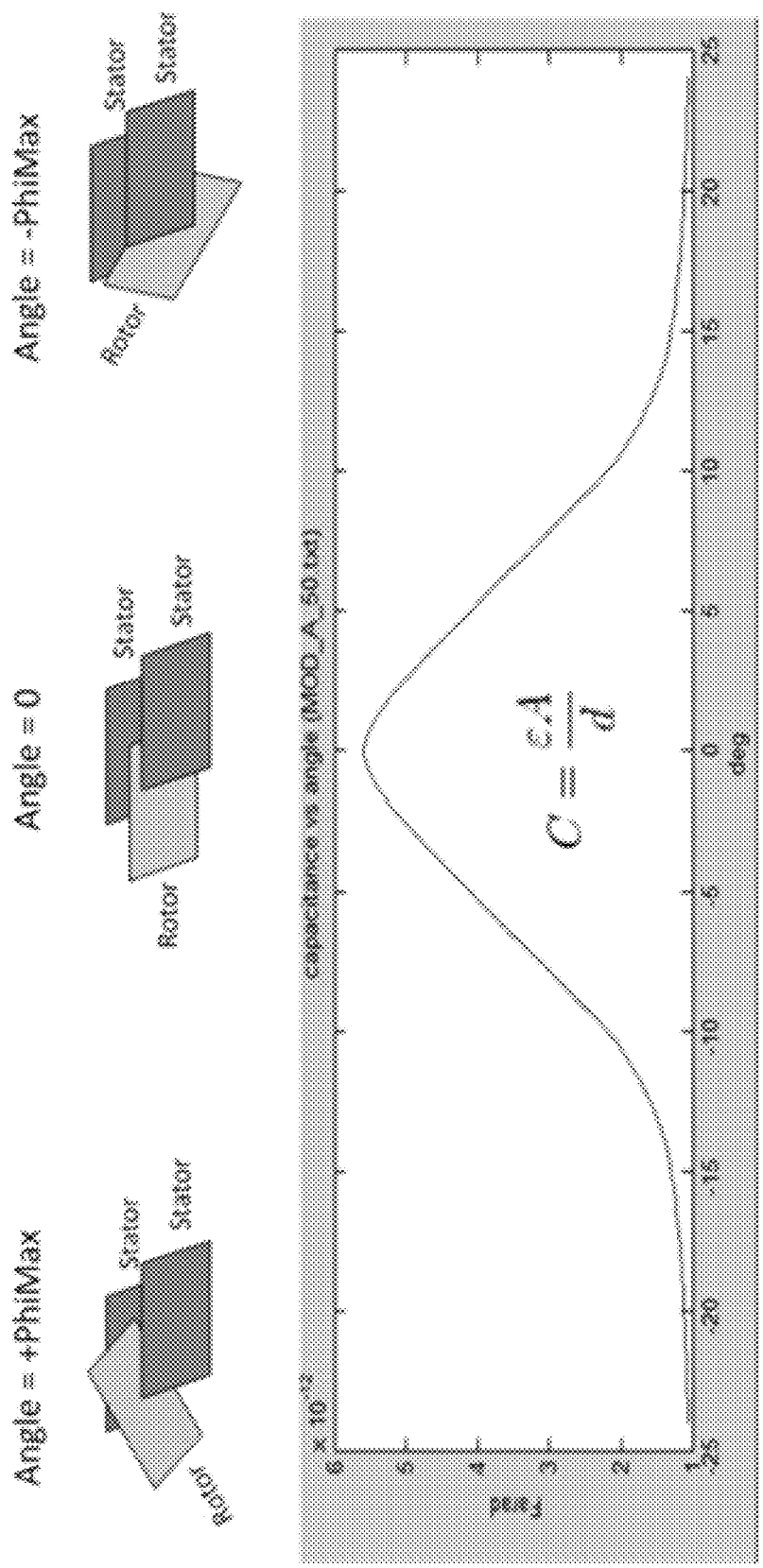
FIG. 4 is a graph of capacitance vs opening angle of a movable MEMS mirror.
Figure 5:
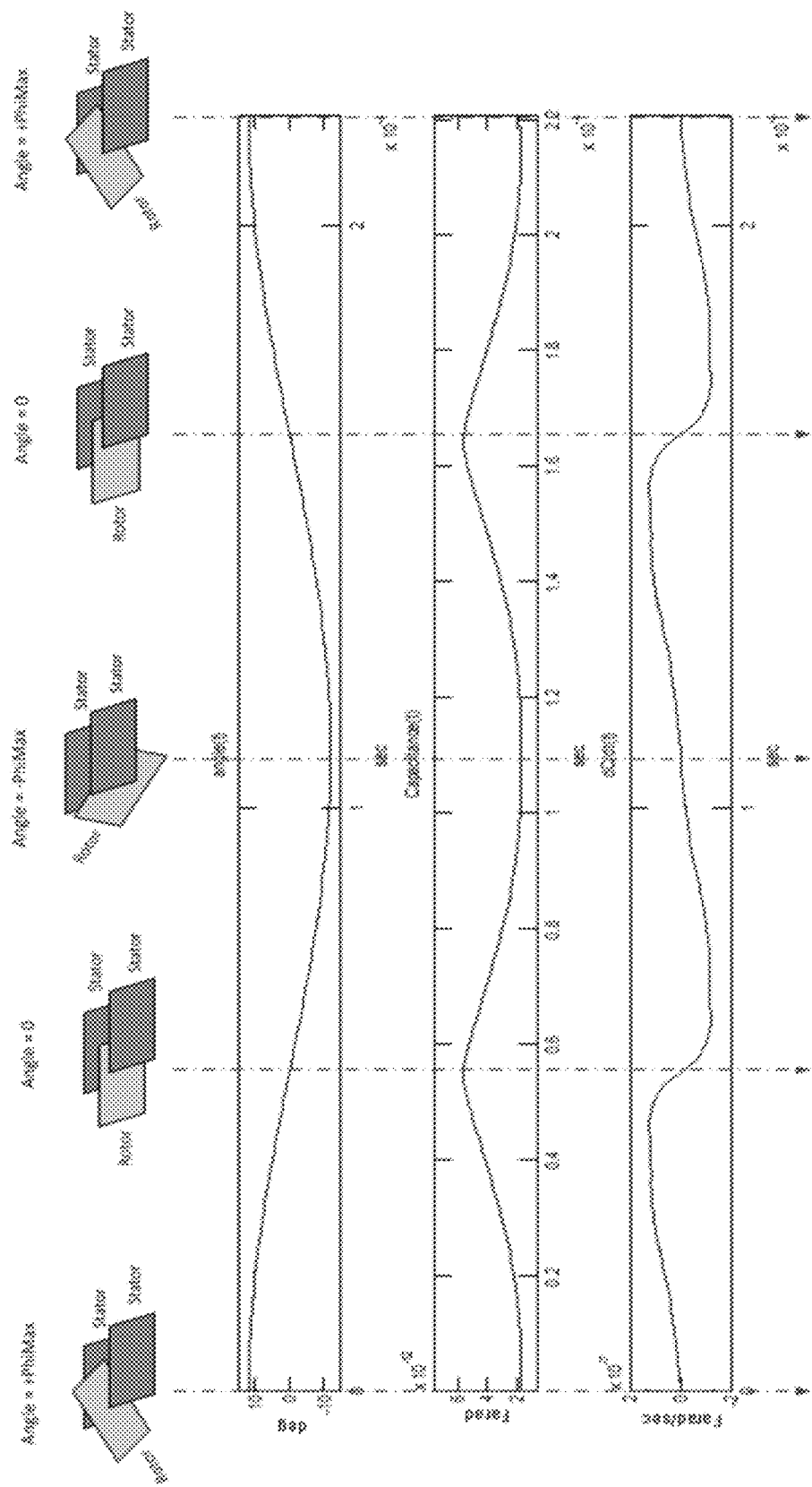
FIG. 5 is a series of graphs that demonstrate typical capacitance changes as a movable MEMS mirror resonates.
Figure 6:
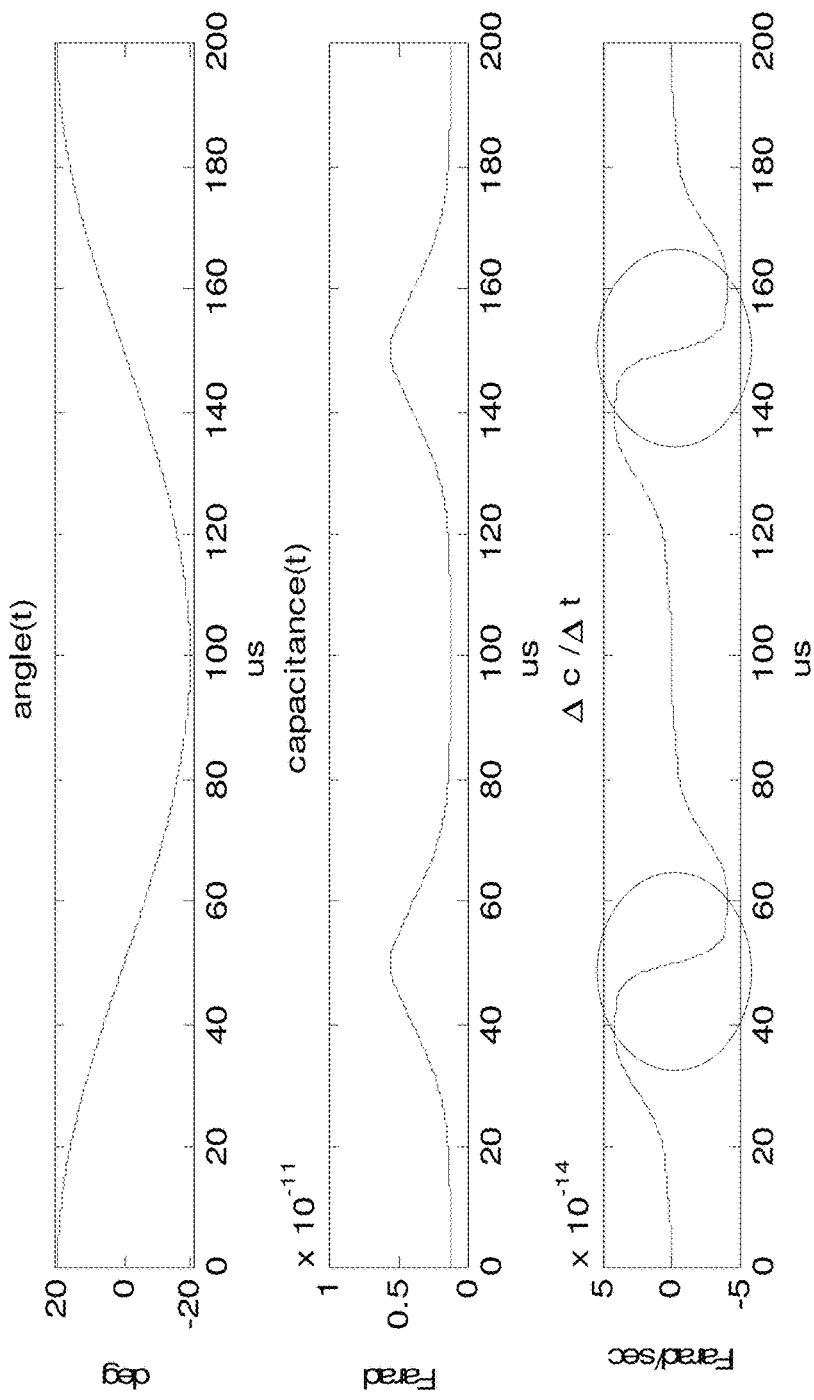
FIG. 6 is another series of graphs that demonstrate typical capacitance changes as a movable MEMS mirror resonates.

The capacitance between the stator 102 and rotor 104 varies as a function of the opening angle of the movable MEMS mirror 100, as shown in FIGS. 4-6. Mathematically, the charge on a capacitor is equal to the capacitance across the capacitor multiplied by the voltage across the capacitor, which can be represented as:

$$Q(t)=C(t)*V(t)$$

The current through the capacitor is equal to the derivative of the charge with respect to time, which can be represented mathematically as:

$$I(t)=dQ(t)/dt=V(t)*dC/dt+C(t)*dV/dt,\ C(t)=f(\varphi(t))$$

Since V(t) is constant at the time of sampling, the C(t)*dV/dt term cancels out, and I(t) is dependent on the change in capacitance.

The graph of FIG. 4 shows how capacitance is a function of the opening angle, and typical values for dC/dt are shown in FIGS. 5-6.

Operation of the system 200 will now be described referring back to FIG. 3A. The amplifier 202 receives the output signal from the rotor of the MEMS mirror 100, and amplifies it by a factor of K. After amplification, this signal can be represented as:

$$\text{Signal}(t) = K \cdot dC(t)/dt + \text{Offset}$$

The offset can be ignored for the purposes of the techniques described herein. The purpose of the amplifier 202 and the amplification factor K is to amplify the signal such that changes due to capacitance changes of the MEMS mirror 100 are sampleable by the ADC 214.

As the rotor of the MEMS mirror 100 rotates, a maximum capacitance exists between the rotor and stator at the instant when the rotor is parallel to the plane of the stator. At this instant, the change in capacitance, and thus dC(t)/dt, is zero. Thus, the time at which the capacitance is at a maximum is known.

$$\text{Signal}(t_{maxCapacitance}) = K \cdot dC(t_{maxCapacitance})/dt$$

If the sum of the changes in capacitance from the time at which the capacitance is at a maximum until a given time T2 at which it is desired to know the opening angle of the MEMS mirror 100 is taken, the total change in capacitance from the maximum capacitance is known. This can be calculated as:

$$\Delta C(t_2) = 1/K \int_{t_{maxCapacitance}}^{t_2} \text{Signal}(t)dt$$

This integration is performed by the integrator 212. The ADC 214 samples the output of the integrator 212, and then the microprocessor 216 calculates the capacitance at time T2 from $\Delta C(t_2)$ as:

$$C(t_2) = C_{max} + \Delta C(t_2)$$

Having calculated the capacitance at time T2, the opening angle of the MEMS mirror 100 at time T2 $\phi(t_2)$ can thus, as shown in FIG. 4, be determined as:

$$\phi(t_2) = f(C(t_2))$$

Usually, K is stable and determined by the value of the resistor R in the feedback path of the amplifier 202. However, in some instances, due to environmental conditions such as temperature, the amplification factor K may change. Therefore, optionally, normalization may be performed together with the integration. Thus, $\Delta C(t_2)$ may be calculated as:

$$\Delta C_{normalized}(t_2) = 1/\text{Signal}(t_{maxCapacitance}) \int_{t_{maxCapacitance}}^{t_2} \text{Signal}(t)dt$$

This helps to make the determination of the opening angle of the MEMS mirror 100 accurate and robust over a wide range of environmental conditions.

It should be appreciated that the hardware integrator 212 need not be used, and that this function may be performed digitally by the microprocessor 216. An embodiment where the microprocessor 216 may perform the integration is shown in FIG. 3B.

Figure 3A:
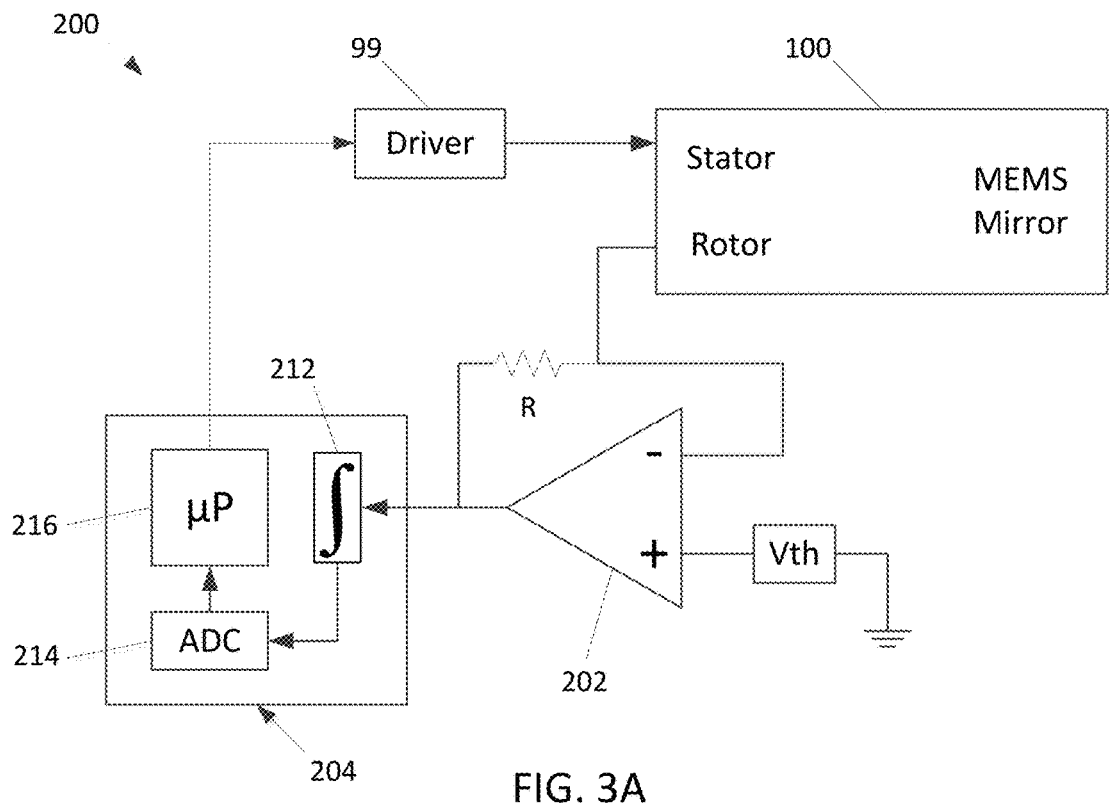
FIG. 3A is a schematic block diagram of a system for measuring and controlling the opening angle of a MEMS mirror that utilizes a hardware integrator in accordance with the techniques described in this disclosure.
Figure 3B:
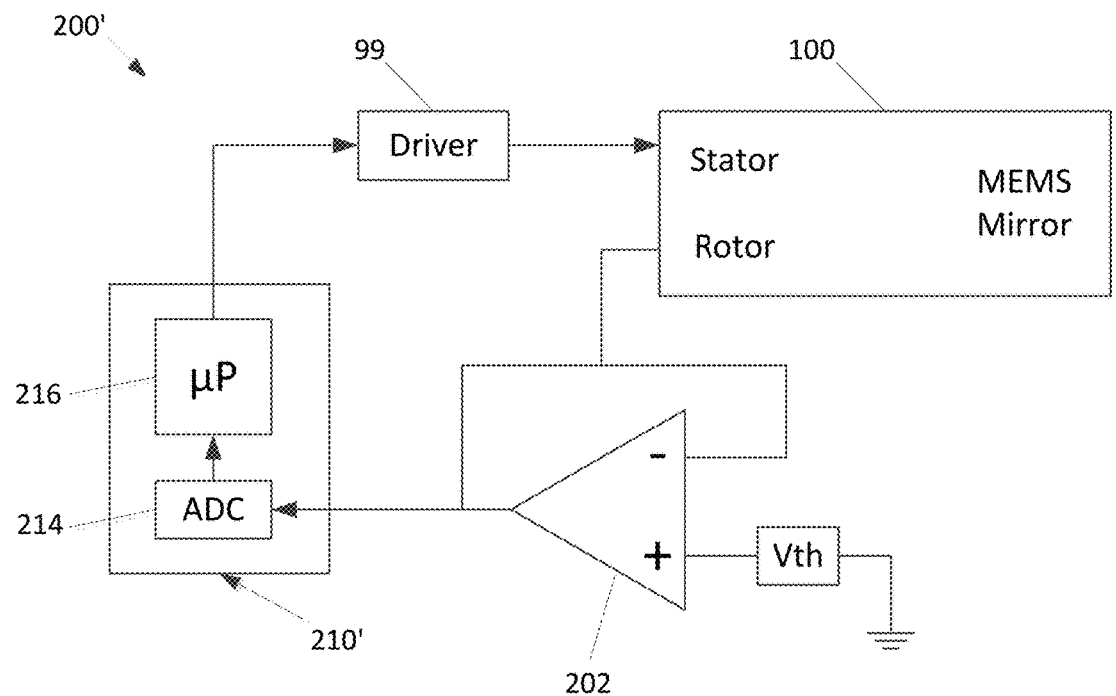
FIG. 3B is a schematic block diagram of a system for measuring and controlling the opening angle of a MEMS mirror in accordance with the techniques described in this disclosure.

The system 200' shown in FIG. 3B operates as the system 200 of FIG. 3A, except the hardware integrator is not present, and the output of the amplifier 202 is fed directly to the input of the ADC 214. As stated, here, the microprocessor 216 may perform the integration.

In some instances, however, with this embodiment, a linear approximation may be used rather than an integration. As can be seen from FIG. 6, about the maximum capacitance, the signal remains substantially linear. Thus, where T2 is sufficiently close to the time at which the capacitance is at a maximum, the signal dC(t)/dt can be treated as linear, and $\Delta C(t_2)$ can be calculated as:

$$\Delta C(t_2) = 1/K \int_{t_{maxCapacitance}}^{t_2} \text{Signal}(t)dt = 1/K(t_2 - t_{maxCapacitance}) \cdot \text{Signal}(t_2 - \text{Signal}(t_{maxCapacitance})/2)$$

This linear approximation technique may be advantageous when it is desired to save processing power, or to calculate the opening angle of the MEMS mirror 100 quickly without the use of a hardware integrator.

The determined opening angle of the MEMS mirror 100 can be used for controlling the opening angle in real time. The microprocessor 216 can use this opening angle to determine a gain to be applied to the driving period signal by the driver 99 which will result in the opening angle changing to a desired value. Thus, the opening angle can be used to create a control loop capable of not only precisely keeping the opening angle at a desired value, but also for changing the opening angle to a different desired value.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method of determining an opening angle of a movable MEMS mirror, the method comprising:
   determining a total change in capacitance of the movable MEMS mirror from a time at which the capacitance of the movable MEMS mirror is at a maximum to a given time; and
   calculating the opening angle of the movable MEMS mirror at the given time based upon the total change in capacitance.

2. The method of claim 1, further comprising controlling the opening angle of the movable MEMS mirror by adjusting a drive signal for the movable MEMS mirror as a function of the calculated opening angle.

3. The method of claim 1, further comprising determining the capacitance of the movable MEMS mirror based upon a mirror sense signal; wherein the total change in capacitance of the movable MEMS mirror is determined as a function of a difference between a value of the mirror sense signal at the given time and a value of the mirror sense signal at the time at which the capacitance of the movable MEMS mirror is at the maximum capacitance, and a difference between the given time and the time at which the capacitance of the movable MEMS mirror is at the maximum capacitance.

4. The method of claim 1, wherein calculating the capacitance of the movable MEMS mirror from the total change in capacitance includes calculating the capacitance of the movable MEMS mirror at the given time based upon the total change in capacitance, and calculating the opening angle of the movable MEMS mirror at the given time based upon the capacitance of the movable MEMS mirror at the given time.

5. The method of claim 1, wherein determining the total change in capacitance of the movable MEMS mirror is performed by integrating a mirror sense signal from the time at which the capacitance of the movable MEMS mirror is at the maximum to the given time.

6. A picoprojector, comprising:
   a housing;
   a laser generator within the housing;
   a movable MEMS mirror within the housing and upon which a laser generated by the laser generator impinges;

mirror drive circuitry configured to generate a drive signal for the movable MEMS mirror;
a feedback circuit configured to measure a mirror sense signal flowing through the movable MEMS mirror; and
processing circuitry configured, based upon the mirror sense signal, to:
  determine an opening angle of the movable MEMS mirror at a given time, as a function of a total change in capacitance of the movable MEMS mirror from a time at which the capacitance of the movable MEMS mirror is at a maximum to the given time, and as a function of the capacitance at the given time; and
  generate a control signal to cause the mirror drive circuitry to adjust the drive signal as a function of the determined opening angle of the movable MEMS mirror.

7. The picoprojector of claim 6, wherein the mirror drive circuitry changes the drive signal by changing a voltage thereof.

8. The picoprojector of claim 6, wherein the feedback circuit comprises an amplifier configured to amplify the mirror sense signal.

9. The picoprojector of claim 8, wherein the processing circuitry comprises:
  a hardware integrator configured to integrate the amplified mirror sense signal from the time at which the capacitance of the movable MEMS mirror is at the maximum to the given time.

10. The picoprojector of claim 9, wherein the processing circuitry further comprises an analog to digital converter configured to digitize the integrated amplified mirror sense signal.

11. The picoprojector of claim 10, wherein the processing circuitry further comprises a microprocessor configured to determine the total change in capacitance of the movable MEMS mirror by integrating the amplified mirror sense signal from the time at which the capacitance of the movable MEMS mirror is at the maximum to the given time.

12. The picoprojector of claim 6, wherein the processing circuitry determines the total change in capacitance of the movable MEMS mirror, without integration, as a function of the mirror sense signal at the given time, the mirror sense signal at the time at which the capacitance of the movable MEMS mirror is at the maximum capacitance, the given time, and the time at which the capacitance of the movable MEMS mirror is at the maximum capacitance.

13. The picoprojector of claim 6, wherein the processing circuitry determines the total change in capacitance of the movable MEMS mirror compared as a function of a difference between a value of the mirror sense signal at the given time and a value of the mirror sense signal at the time at which the capacitance of the movable MEMS mirror is at the maximum capacitance, multiplied by a difference between the given time and the time at which the capacitance of the movable MEMS mirror is at the maximum capacitance.

14. A picoprojector, comprising:
a housing;
a laser generator within the housing;
a movable MEMS mirror within the housing and upon which a laser generated by the laser generator impinges;
mirror drive circuitry for the movable MEMS mirror;
an amplifier configured to amplify a mirror sense signal flowing through the movable MEMS mirror;
an analog to digital converter configured to receive the amplified version of the mirror sense signal and to generate a digitized version of the mirror sense signal; and
a microprocessor configured to:
  determine an opening angle of the movable MEMS mirror as a function of the digitized mirror sense signal at a given time, the digitized mirror sense signal at a time at which capacitance of the movable MEMS mirror is at the maximum capacitance, the given time, and the time at which the capacitance of the movable MEMS mirror is at the maximum capacitance; and
  generate a control signal for the mirror drive circuitry as a function of the opening angle of the movable MEMS mirror.

15. The picoprojector of claim 14, wherein the control signal generated by the microprocessor causes the mirror drive circuitry to change a generated mirror drive signal for the movable MEMS mirror so that the capacitance of the movable MEMS mirror at the given time equals a capacitance value associated with the opening angle; and
wherein the generated mirror drive signal is such to cause the movable MEMS mirror to oscillate at its resonance frequency.

* * * * *